Patented May 31, 1932

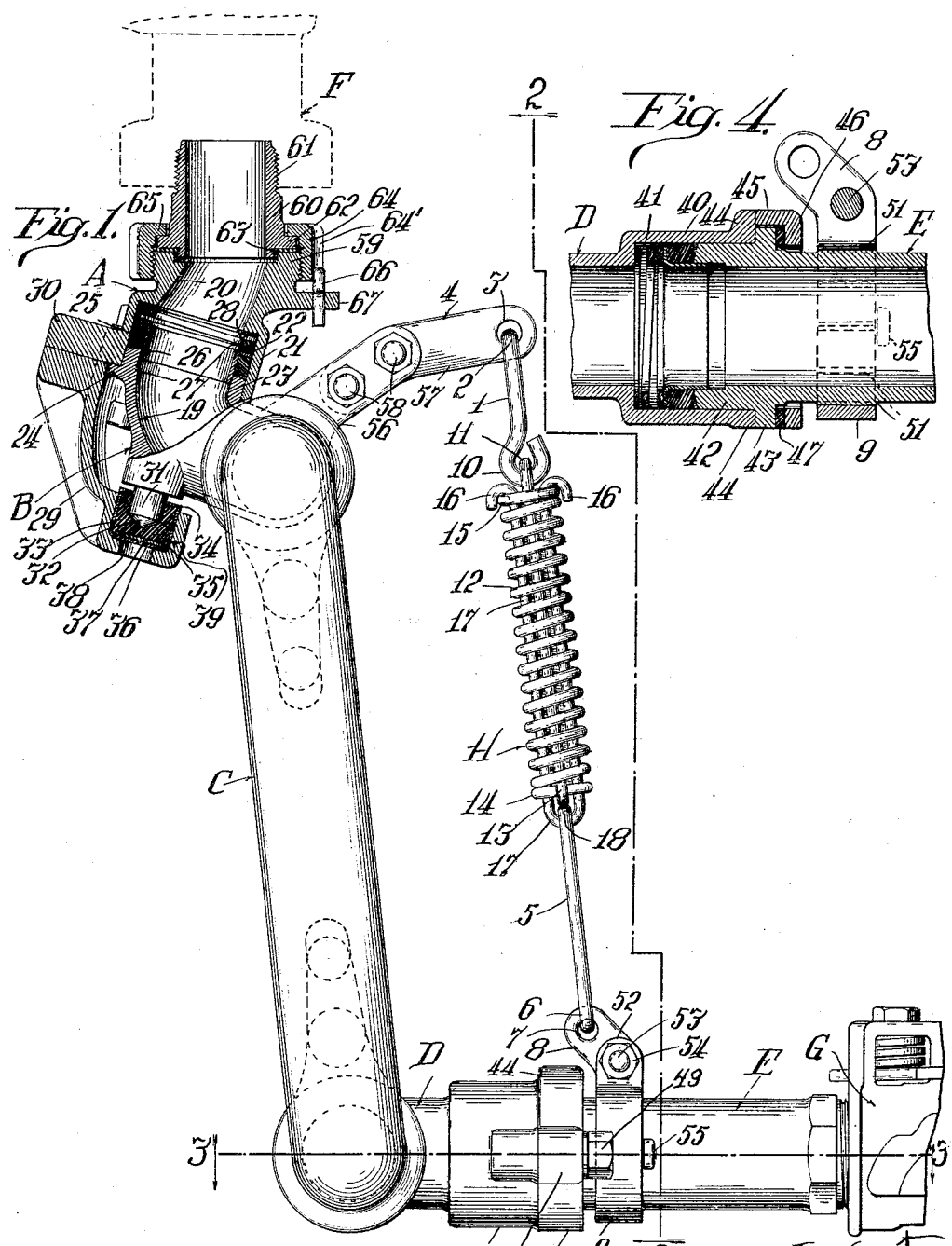

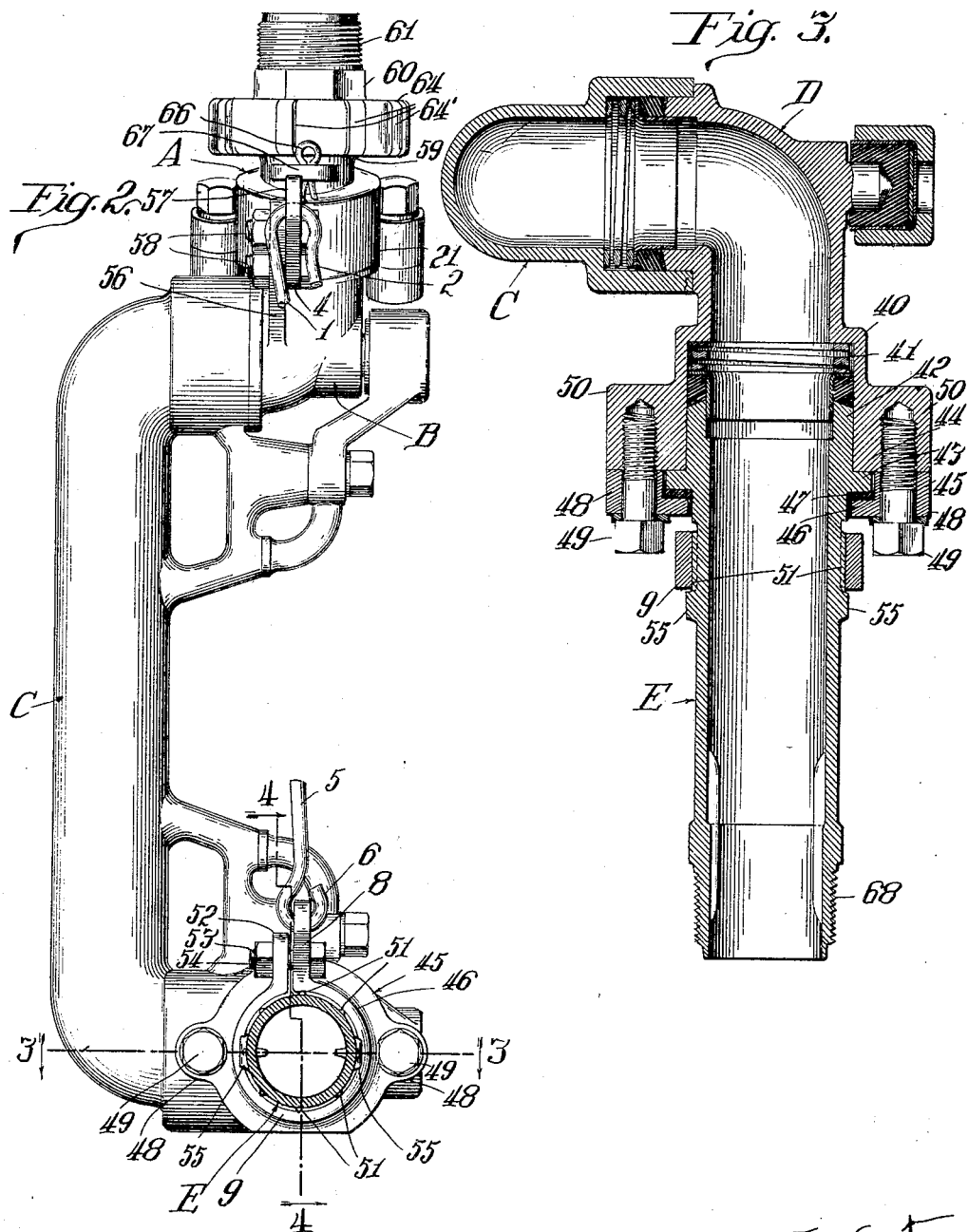

1,860,956

UNITED STATES PATENT OFFICE

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK

FLEXIBLE PIPE STRUCTURE

Application filed July 25, 1929. Serial No. 380,948.

This invention relates to certain new and useful improvements in a conduit structure of the type consisting of metal elements flexibly articulated or swiveled together so as to form a fluid-tight connection between the train pipes of the adjacent cars of a railway train. The complete connection consists of two of these flexible metallic structures, one for each of the train pipes to be connected, these structures being coupled together by any suitable form of pipe coupler.

The improved conduit structure consists of a plurality of tubular conduit members, some of which are formed with elbows, the ends of each adjacent pair of members being telescoped one within the other and provided with means for sealing the joint against the escape of steam without interfering with relative rotation between the members about the axis of the telescoped members. The several elbows and swiveled joints between the members are so arranged that although one end of the flexible structure is rigidly supported from the car train pipe, or the end train pipe valve, the coupler mounted at the other end of the conduit structure is permitted a practically universal movement in any direction to allow for the relative movements between the cars and to permit the two couplers to be secured together or disconnected. A flexible conduit structure of this general type is disclosed in the copending application of Gold and Russell, Serial No. 229,755, filed October 29, 1927, now Patent Number 1,781,457 granted Nov. 11, 1930.

The particular objects of the present invention are to provide improved means for adjustably supporting the entire flexible conduit structure from the car, and for supporting the lower horizontally extending conduit section from one of the upper conduit sections, whereby the several portions of the structure can be easily and effectively connected with one another and properly lined up in operative position on the car without interfering with adjacent portions of the car structure or other apparatus. The upper end of the flexible conduit structure is connected with the car train pipe or the end valve on the car, by means of a threaded connection and when this connection is screwed into place the laterally extending portions of the conduit structure do not always extend in the desired direction. A similar threaded connection is made between the pipe coupler and the lower horizontally extending section of the conduit structure, and when these parts have been threaded together the means for flexibly supporting the lower horizontally extending conduit section from the upper portion of the structure is not always properly aligned. The present invention relates to improvements whereby these members may all be properly aligned, after a properly tight engagement of the threaded members has been secured.

The principal object of this invention is to provide improved adjustable supporting mechanism, such as briefly referred to hereinabove and as disclosed more in detail in the specifications which follow.

Another object of the invention is to provide an improved adapter connection for adjustably supporting the upper end of the flexible pipe structure from the car.

Another object is to provide improved means for adjustably connecting the yieldable supporting means by which the horizontally extending portion of the flexible conduit structure is held in position when detached from the conduit on the adjacent car.

Other objects and advantages of the invention will be more apparent from the following detailed description of one approved form of apparatus embodying the principles of this invention.

In the accompanying drawings:

Fig. 1 is a side elevation, partially in section, of the assembled flexible conduit structure.

Fig. 2 is a front elevation, with the lower portion taken in vertical section substantially on the line 2—2 of Fig. 1.

Fig. 3 is a horizontal section taken substantially on the line 3—3 of Figs. 1 and 2.

Fig. 4 is a partial vertical section taken substantially on the line 4—4 of Fig. 2.

The flexible conduit structure consists of a plurality of rigid conduit members A, B, C, D, and E, which are swiveled together, as hereinafter explained more in detail. The uppermost conduit member A is adapted to support the entire assembly by being attached to the end of the car train pipe, or more usually to the end train pipe valve, indicated by dotted lines at F in Fig. 1. The coupler member G, which may be of any approved form, is mounted at the free end of the conduit member E at the lower horizontally extending end of the flexible structure. This coupler G is adapted to be mated with a similar coupler of the adjacent car, so as to form a continuous flexible conduit connection between the two cars.

A means, shown generally at H, is provided to support the lower members D, E and G of the structure when disconnected from an adjacent car coupling. In the form here shown, this connection H comprises an upper link 1 having a hooked upper end 2 engaging in an opening 3 in an arm 4 extending outwardly from one side of the upper elbow conduit member B and projecting over the lower horizontally extending conduit member E. A lower link 5 has a hook 6 at its lower end engaging in an eye 7 in the ear 8 formed at the upper side of a split ring 9 clamped about the lower conduit member E, as hereinafter explained. The lower end of upper link 1 is hooked at 10 within the closed upper end of a U-shaped member 11 which projects downwardly through a compression spring 12. The lower hooked ends 13 of member 11 engage about an annular washer 14, which forms an abutment for the lower end of compression spring 12. A similar washer 15 at the other end of spring 12 is engaged by the hooked ends 16 of a U-shaped member 17 similar to member 11. The lower closed end of member 17 is engaged with the upper hooked end 18 of lower link 5. This assembled supporting connection is not only sufficiently flexible to permit the necessary movements of the lower horizontally extending conduit members, but the compression spring 12 will also give sufficiently to permit the necessary extension of the conduit structure when the train is rounding curves. It will be apparent from the description which follows that when the coupler G is disconnected from a mating coupler, the supporting means H will hold the assembly C, D, E and G from swinging backwardly and downwardly about the swiveled joint at the lower end of elbow member B. The rearward inclination of the swiveled joint at the upper end of the elbow B will also tend to prevent the complete conduit assembly from swinging to one side or the other, about the upper supporting conduit member A, so that the entire structure will tend to remain in substantially the position shown in Fig. 1, even though the couplers G are disconnected.

The inner cylindrical wall 19 of each of the conduit members is practically continuous and of constant diameter from one end of the conduit structure to the other to form an unbroken steam passage. The lower portion of conduit member A is inclined rearwardly at a small angle, as indicated at 20 in Fig. 1, the conduit section A being formed at its lower end with an enlarged head 21, in which is a cylindrical socket 22 of greater outer diameter than the bore of the conduit structure. The upper end of the mating conduit section B is formed with an annular nipple 23 adapted to fit snugly within the outer end portion of socket 22 and to swivel within this socket about the axis of the bore of the swiveled conduit members. An outer annular flange 24 limits the projection of nipple 23 into socket 22.

An annular gasket 25 formed of any suitable gasket composition is housed within the socket 22 and has an outer cylindrical surface adapted to fit snugly against the cylindrical outer wall of the socket. The outer end portion of gasket 25 engages the inner end of nipple 23, and a metallic ferrule 26 encloses the opposite end of gasket 25 and the inner cylindrical surface of the gasket. An expansion spring 27 is confined between the outwardly extending radial flange at the upper end of ferrule 26 and the upper end 28 of socket 22 so as to force the gasket against the end of nipple 23. The engaging ends of the gasket 25 and nipple 23 are beveled upwardly, as shown in the drawings, so as to urge the gasket outwardly and force the gasket into firmer sealing relation with the outer wall of socket 22. The spring 27 is primarily for the purpose of keeping the gasket or sealing means in place when the flexible structure is not under fluid pressure. When steam is passing through the conduit, it will expand against the inner surface and the inner end of the gasket structure so as to force the gasket into firm sealing relation with the wall of socket 22 and the inner end of nipple 23.

In order to support the elbow conduit section B and parts carried thereby, and also to resist the expansive action of spring 27 and the fluid pressure within the conduit, both of which tend to force the member B from its telescoped position within the lower end of member A, a suitable thrust bearing is provided between the lower outer surface of elbow B and a bracket arm 20 which is secured at its upper end to a flange portion 30 on member A and which projects at its lower end beneath the elbow portion of member B. On the outer surface of the elbow of member B is formed an outwardly projecting cylindrical stud or gudgeon 31 concentric with the axis of the swiveled joint between the two conduit sections. Preferably the end of stud 31 is in the form of an outwardly projecting cone 32, the point of which terminates in the axis of rotation of the pipe joint.

A cylindrical block 33 of suitable bearing composition is formed with a central cylindrical socket 34 open at its upper end and having a conical inner end adapted to receive the cone 32 at the end of stud 31. The stud 31 is adapted to be rotatably journaled in the cylindrical recess or socket 34 and the conical end 32 of the stud engages the inner conical end of the socket to take up the end thrust. The bearing block 33 is enclosed in a metallic thimble 35, which is open at its upper end, and closed at its outer end 36. A steel reinforcing plate 37 is preferably positioned in the closed end of the thimble to bridge the central opening 38 in the socket 39 in bracket arm 29 which receives the bushing assembly. The purpose of the opening 38 is to facilitate the removal of the bushing assembly from its position within the bracket arm.

The bearing block 33 is preferably formed of a material known as "Noscorite", this being a composition of a phenolic condensation product and a natural clay having desirable lubricating qualities. This composition material is very hard, but is self lubricating.

It will be noted that the stud 31 journaled in socket 34 and the nipple 23 journaled in socket 22 provide two longitudinally spaced but coaxial bearings, by means of which the elbow section B is journaled in and supported from the conduit section A, so as to reduce twisting strains and provide a substantial and durable swiveled joint. While the swiveled bearings and sealing means, as above described, are preferable, it is to be understood that other equivalent swiveling and sealing connections might be used between the several pairs of conduit sections, as far as the particular subject matter of the present invention is concerned, as hereinafter set forth and as limited by the claims which follow. It is to be understood that exactly similar swiveled connections and sealing means are employed between the lower end of elbow member B and the upper end of conduit section C, and also between the conduit sections C and D.

The swiveled connection between sections D and E is somewhat different, as shown more in detail in Figs. 3 and 4. The elbow section D is provided with an enlarged horizontally projecting end portion 40 formed with an internal cylindrical socket 41. The annular nipple 42 at the rear end of horizontal conduit section E is journaled within the open end of socket 41. A gasket sealing assembly, in all respects the same as the one previously described, is interposed within socket 41 and engaging the inner end of nipple 42. An outwardly extending annular flange 43 on member E engages the flange 44 at the end of member D to limit the movement of nipple 42 into socket 41. A retaining ring 45 is provided with an inwardly extending flange 46 adapted to project behind the flange 43 on member E, a thrust washer 47 being interposed between the two flanges. Retaining ring 45 is provided with laterally projecting ears 48 at its two sides, and screw bolts 49 engage through these ears into corresponding ears or lugs 50 formed on the enlarged portion 40 of member D. It will be noted that the securing means for holding the retaining ring 45 in place are located entirely at the sides of the conduit structure, so that practically all of the downwardly projecting portions of the flange 44 and retaining ring 45 may be removed at the lower side of the structure, as clearly shown in Figs. 1 and 4, so as to provide a maximum of clearance beneath the conduit structure. On the outer surface of the conduit member E is formed a series of outwardly projecting ribs 51 which extend longitudinally of the conduit member and are spaced apart about the periphery of the conduit section. The split supporting ring 9, previously referred to, is provided at one end with the upwardly projecting ear 8, to which the connection H is attached, and at its other end, with a corresponding shorter ear 52, a screw bolt 53 having a nut 44 on its inner end projecting through suitable apertures in the ears 8 and 52, whereby the split ring may be clamped about the ribs 51 on member E in any desired position of peripheral adjustment about the conduit member. The ribs 51 have fairly sharp outer edges whereby the ring 9 will be held securely in position when the nut 54 is suitably screwed in on bolt 53 so as to bring the ears 8 and 52 toward one another. A pair of lugs 55 formed on opposite sides of the conduit section E prevents movement of split ring 9 outwardly along the conduit member E. Movement of the ring in the opposite direction is limited by the adjacent connecting means between the conduit sections D and E.

The projecting arm 4 on upper elbow B might be made in the form of a single integral arm extending outwardly from this conduit section, but is preferably made of an inner integral arm member 56 and an outer detachable arm extension 57 connected with portion 56 by screw bolts or other fastening means 58. It sometimes happens that adjacent parts of the structures carried by the car prevent the rotation into position of the assembled conduit structure when the supporting arm 4 is formed integral with the member B. In such installations, the extension arm 57 can be attached after the other portions of the apparatus have been screwed into position.

The upper conduit member A is provided at its upper end with an externally threaded portion 59. An adapter member 60 is threaded at its upper end 61 to engage in the end train pipe valve F, from which the conduit structure is supported. The lower end of adapter 60 is provided with an outwardly extending annular flange 62, and a gasket or sealing washer 63 is clamped between the lower end of adapter 60 and the upper end of conduit section A. A union ring 64 is internally threaded to engage the threaded end portion 59 of section A, and is provided at its upper end with an inwardly extending annular shoulder 65 adapted to engage over flange 62 on the adapter 60, whereby the conduit structure is supported from the adapter and the members are clamped firmly together. The outer periphery of union ring 64 is formed with a plurality of spaced vertical notches or recesses 64', any one of which is adapted to receive the upwardly projecting portion of a cotter pin 66 or similar locking device removably secured in a lug 67 projecting from conduit section A. By this means the union ring 64 is locked against working loose after it has been screwed tightly into position.

It should now be apparent that when the conduit structure, hereinabove disclosed, is in position on the car, the lower horizontally extending portion of the structure must extend in a definite direction to properly engage with the mating conduit structure on the adjacent car. If the threaded connection by means of which the upper section A is attached to and supported from the valve on the car were formed integrally on the upper member A, there would be no certainty that when screwed to final position the assembly would be disposed in the proper angular position on the car. By providing a separate adapter member 60, which is first screwed tightly into position, the angular position of the lower horizontally projecting portion of the assembly can then be properly positioned by loosening the union ring 64 and turning the conduit assembly with relation to the adapter 60. By again tightening the union ring 64 and securing the locking pin 66 in place, the assembly is now properly positioned on the car.

In a similar manner, the outer end of lower conduit section E is threaded at 68 to engage the coupler G. The opposite end of conduit section E which engages with the elbow section D is symmetrical about its entire periphery so that an angular variation in the final position of conduit section E is immaterial and after the members E and G have been tightly screwed together the coupler G may be turned to its proper upright position. However, if the ear 8 for attaching the supporting connection H were made integral with the conduit section E, there would be no certainty that this ear would project upwardly in its proper vertical position. By positioning the ear 8 on the split ring 9, which can be adjusted peripherally around the conduit section E, the supporting ear 8 may be properly positioned no matter what the final angular position of conduit section E may be.

It will now be seen that the combination of the upper adjustable adapter member 60, the lower adjustable split ring 9, and the extension arm 4, permits the flexible conduit structure to be tightly assembled and properly positioned on and supported from the car under all circumstances. If adjacent members of the car prohibit the rotation of the entire assembly to its final position, the extension arm 57 of arm 4 can be removed and the lower portion of the conduit structure can be swung down to a substantially vertical position, until the upper adapter has been properly screwed into place in end valve F.

It will be seen that a plurality of alternative adapter members 60 may be provided, having upper end portions of different inclinations and of different diameters so as to permit the flexible conduit assembly to be supported from various sizes and forms of car pipes or end valves.

I claim:

1. In combination with a flexible metallic conduit structure consisting of a plurality of separate conduit sections swiveled together and comprising an upper conduit section having a substantially vertically extending upper open end portion, and a substantially horizontally extending lower conduit section, of means for adjustably supporting the conduit structure comprising an upper adapter member having a threaded upper end to be engaged with a relatively fixed supporting structure, the adapter member having an outwardly extending annular flange adjacent its open lower end, the upper end portion of the upper conduit section being threaded, and a union ring threaded to engage the upper conduit section and having an inwardly extending upper annular flange to clamp over the flange on the adapter and non-rotatably secure the upper conduit section to the adapter, there being an outwardly projecting perforated lug on the upper conduit section and a plurality of notches about the periphery of the union ring, and a detachable locking pin adapted to be engaged in the lug and one of the notches.

2. In combination with a flexible metallic conduit structure consisting of a plurality of separate conduit sections swiveled together and comprising an upper conduit section having a substantially vertically extending upper open end portion, and a substantially horizontally extending lower conduit section, of means for adjustably supporting the conduit structure comprising an upper adapter member having a threaded upper end to be engaged with a relatively fixed supporting structure, the adapter member having an outwardly extending annular flange adjacent its open lower end, the upper end portion of the upper conduit section being threaded, a gasket adapted to be clamped between the upper conduit section and the adapter, and a union ring threaded to engage the upper conduit section and having an inwardly extending upper annular flange to clamp over the flange on the adapter and non-rotatably secure the upper conduit section to the adapter, there being an outwardly projecting perforated lug on the upper conduit section and a plurality of notches about the periphery of the union ring, and a detachable locking pin adapted to be engaged in the lug and one of the notches.

3. In combination with a flexible metallic conduit structure consisting of a plurality of separate conduit sections swiveled together and comprising a substantially vertically extending upper section, means for supporting this section from its upper end, a second section swiveled to the upper section for rotary movement about a substantially vertical axis, a lower horizontally extending conduit section, and sections flexibly supporting the lower section from the said second conduit section, a coupler having threaded engagement with the free end of the lower conduit section, said lower section being freely rotatable about its longitudinal axis to effect the threaded engagement, of means for yieldably supporting the lower section in its substantially horizontal position comprising an arm projecting laterally from the second conduit section over the lower conduit section, a yieldable supporting device suspended from the arm, the lower section having a plurality of longitudinally extending ribs spaced about its periphery, and a split ring adjustably clamped about these ribs and having an ear to which the lower end of the supporting device is anchored.

EDWARD A. RUSSELL.